US011541495B2

(12) United States Patent
Sun

(10) Patent No.: US 11,541,495 B2
(45) Date of Patent: Jan. 3, 2023

(54) DRUM-TYPE TOOL MAGAZINE ADAPTIVE TO MULTI-AXIS MACHINING CENTER

(71) Applicant: Chen Sound Industrial Co., Ltd., Taichung (TW)

(72) Inventor: Ying Sun, Taichung (TW)

(73) Assignee: CHEN SOUND INDUSTRIAL CO., LTD., Taichung (TW)

( * ) Notice: Subject to any disclaimer, the term of this patent is extended or adjusted under 35 U.S.C. 154(b) by 0 days.

(21) Appl. No.: 17/531,221

(22) Filed: Nov. 19, 2021

(65) Prior Publication Data

US 2022/0152762 A1    May 19, 2022

(30) Foreign Application Priority Data

Nov. 19, 2020    (TW) .................................. 109140575

(51) Int. Cl.
*B23Q 3/157* (2006.01)
*B23Q 3/155* (2006.01)

(52) U.S. Cl.
CPC ........ *B23Q 3/15722* (2016.11); *B23Q 3/1576* (2013.01); *B23Q 3/15706* (2013.01); *B23Q 3/15786* (2013.01); *B23Q 2003/15527* (2016.11); *Y10T 483/1795* (2015.01); *Y10T 483/1882* (2015.01)

(58) Field of Classification Search
CPC ......... Y10T 483/1882; Y10T 483/1873; Y10T 483/1809; Y10T 483/1845;
(Continued)

(56) References Cited

U.S. PATENT DOCUMENTS 4,783,902 A * 11/1988 Novak ............... B23Q 3/15539
483/66
4,920,631 A * 5/1990 Novak ............... B23Q 3/15722
483/66
(Continued)

FOREIGN PATENT DOCUMENTS

CN    104802015 A  *  7/2015
CN    110340707 A  *  10/2019
(Continued)

OTHER PUBLICATIONS

Machine Translation of CN 111113115 A, which CN '115 was published May 2020.*
(Continued)

*Primary Examiner* — Erica E Cadugan
(74) *Attorney, Agent, or Firm* — Muncy, Geissler, Olds & Lowe, P.C.

(57) ABSTRACT

A drum-type tool magazine adaptive to a multi-axis machining center allows the machining center to use spindles to directly take and replace tool holders that hold machining tools. The drum-type tool magazine includes a driving member, a drum, and plural tool clamps. The drum is centrally provided with a rotating shaft and peripherally provided with plural separated mounts that are arranged circularly. The driving member drives the drum to rotate. Plural tool clamps are arranged abreast on each of the mount. Every tool clamp of the same mount has a tool-clamping jaw parallel to a tangential direction at a periphery of the drum and communicated with the tool clamp so that the machining tool when clamped is laid horizontal and located close to the periphery of the drum. This allows the volume of the tool magazine to be minimized.

12 Claims, 15 Drawing Sheets

(58) Field of Classification Search
CPC .......... Y10T 483/1975; B23Q 3/15722; B23Q 3/15526; B23Q 3/15553; B23Q 3/15706; B23Q 3/1554–2003/155456; Y10S 483/902
USPC .......... 483/67, 66, 59, 63, 56, 902
See application file for complete search history.

(56) References Cited

U.S. PATENT DOCUMENTS

| | | | |
|---|---|---|---|
| 6,228,006 B1 * | 5/2001 | Horn | B23Q 3/15722 483/67 |
| 2022/0152761 A1 * | 5/2022 | Sun | B23Q 3/15706 |

FOREIGN PATENT DOCUMENTS

| | | | |
|---|---|---|---|
| CN | 111113115 A | * | 5/2020 |
| DE | 3539296 A1 | * | 5/1987 |
| DE | 3707318 A1 | * | 9/1988 |
| EP | 0555576 A1 | * | 8/1993 |
| EP | 0901878 A1 | * | 3/1999 |
| GB | 1341577 A | * | 12/1973 |
| JP | 61-197137 A | * | 9/1986 |
| JP | 62-102938 A | * | 5/1987 |
| KR | 2012-0138470 A | * | 12/2012 |
| TW | M534056 U | | 12/2016 |
| TW | I658896 B | | 5/2019 |

OTHER PUBLICATIONS

Definition of "tangential" from https://www.vocabulary.com/dictionary/tangential, 3 pages, printed Aug. 8, 2022.*
Machine Translation of CN 110340707 A, which CN '707 was published Oct. 2019.*
Machine Translation of CN 104802015 A, which CN '015 was published Jul. 2015.*

* cited by examiner

DRUM-TYPE TOOL MAGAZINE ADAPTIVE TO MULTI-AXIS MACHINING CENTER

BACKGROUND OF THE INVENTION

1. Field of the Invention

The present invention relates to tool magazines for machine tools, and more particularly to a drum-type tool magazine adaptive to a multi-axis machining center.

2. Description of the Related Art

For facilitating tool-changing operation during a process of a machining center, there is usually a mating tool magazine provided. Common types of tool magazines include the carousel type, the disc type, the chain type, and the tool-bin type for meeting needs of different processing methods and tools. A tool magazine is a device that stores various processing tools for machining center to selectively use to machine workpieces, and has become an indispensable accessory for a machining center. Therefore, the enthusiasm for designs and innovations focused on tool magazines in the industry is never less than that for the machining center themselves.

Among existing tool clamp structures, one example is the tool magazine rotating unit of a gantry-type machining center machine disclosed in Taiwan Patent No. I658896. The prior-art device is about a disc-type tool magazine whose tool disc is peripherally arranged with tool-clamping portions for clamping tools. Since the tools and the tool disc have their axial directions parallel to each other, if the number of tools is huge, the tool disc has to be large enough to prevent unobstructed tool taking/returning, and this ends up to a bulky, space-consuming tool magazine. Another example is a sheath moving-out type synchronous motion door opening tool magazine as taught by Taiwan Patent No. M534056. This known device uses a chain-type tool magazine, in which a driving unit drives a tool chain composed of chain plates to rotate and in turn drive tool pots to move. Since the tool pots and the driving unit also have parallel axial directions, and the number of tool pots is determined by the size of the tool chain composed of chain plates, more tool pots require a longer tool chain, similarly making the overall device bulky and space-consuming.

In addition to the foregoing defects, the device of Taiwan Patent No. I658896 can only work on a machining center having a single spindle for tool-changing operation. For a multi-axis machining center, the known device is incompatible because it is unable to support two or more spindles to change tools at the same time. As to the device of Taiwan Patent No. M534056 which is also unable to support two or more spindles to change tools, it has a further problem that its tool-changing operation relies on a tool-changing mechanism that includes tool-changing arms, and directly using a spindle to perform tool-changing is impossible to it.

SUMMARY OF THE INVENTION

To meet the aforementioned need, the present invention provides a drum-type tool magazine adaptive to a multi-axis machining center, wherein the tool magazine is of a drum-type structure for storing tool holders that hold machining tools and allowing spindles of the machining center to perform tool-taking or tool-returning operation.

One embodiment of the present invention provides A drum-type tool magazine adaptive to a multi-axis machining center, the drum-type tool magazine allowing the machining center to use at least one spindle to directly take and replace tool holders holding machining tools, and the drum-type tool magazine comprising: a driving member, a drum, and a plurality of tool clamps. The drum is centrally provided with a rotating shaft and has a columnar periphery along which plural separated mounts are arranged circularly. The driving member is connected to and thereby drives the drum to rotate. The tool clamps are arranged abreast on each said mount along an axial direction of the rotating shaft for clamping tool holders. The tool clamps on the same mount have tool-clamping jaws open to the same tool-clamping direction. Each of the tool-clamping jaws is parallel to a tangential direction of the periphery and communicated with the corresponding tool clamp, so that the machining tools held by the tool holders clamped by all the tool clamps are laid horizontal and gathered close to the periphery of the drum.

Accordingly, the disclosed tool magazine is a drum with mounts arranged circularly along its columnar periphery, and each of the mounts has plural tool clamps arranged abreast, so everywhere on the entire periphery of the drum is used to carry as many as tool clamps. Additionally, since the tool-clamping jaws of the tool clamps are parallel to the tangential direction of the drum periphery and communicated with the tool clamps, all the machining tools held by the tool holders can come very close to the drum. With this design, the capacity of the drum for carrying tool clamps can be effectively increased by slightly increasing the length or diameter of the drum, thereby making the most use of space to providing more tool holders without significantly increasing the volume of the tool magazine. Moreover, because the tool clamps on the same mount are arranged abreast and their tool-clamping jaws have the same tool-clamping direction, the disclosed tool magazine when working with a multi-axis machining center can allowing two or more spindles to directly perform tool-taking or tool-returning operation on tool holders clamped by the tool clamps arranged abreast on the same mount at the same time without using any tool-changing arm. As compared to the prior-art device that support a single spindle or use an additional tool-changing arm for tool-changing operation, the present invention can significantly save tool-changing time during operation of the machining center, thereby effectively improving processing efficiency.

DETAILED DESCRIPTION OF THE INVENTION

Figure 1:
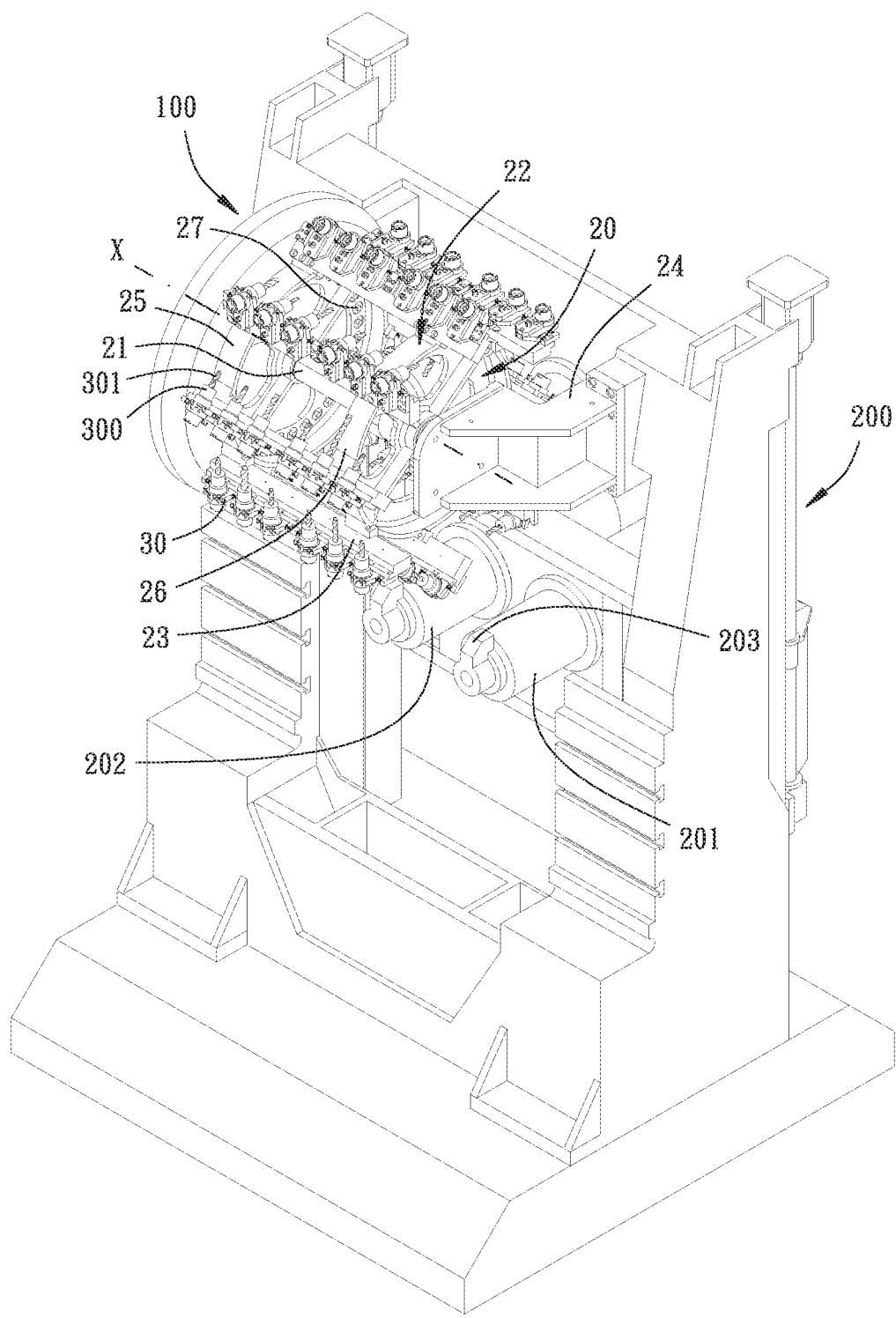
FIG. 1 is an applied view of a tool magazine according to one embodiment of the present invention embodiment installed on a machining center, which is a multi-axis machining center having two spindles.
Figure 2:
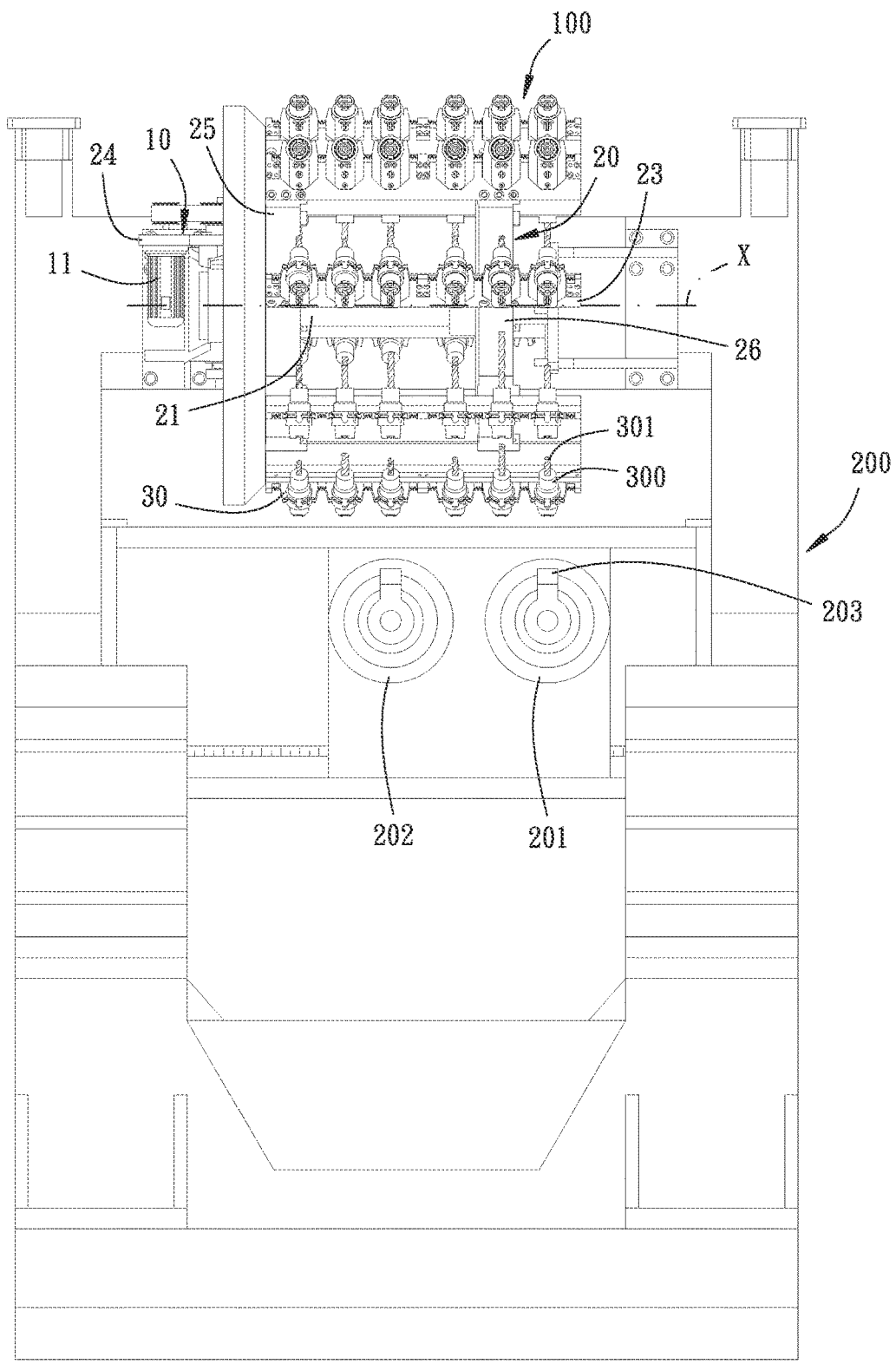
FIG. 2 is a front view of the tool magazine installed on the machining center according to the embodiment of the present invention.

While a preferred embodiment provided hereinafter for illustrating the concept of the present invention has been described above, it is to be understood that the components of the embodiment shown in the accompanying drawings are depicted with scale, dimensions, deformation and/or displacement facilitating easy explanation and need not to be made to exact scale.

Referring to FIG. 1 through FIG. 15, the present invention provides a drum-type tool magazine 100 adaptive to a multi-axis machining center. The tool magazine 100 comprises a driving member 10, a drum 20, and a plurality of tool clamps 30, which will be detailed below.

The drum 20 is centrally provided with a rotating shaft 21. The rotating shaft 21 defines an axial direction X. The drum 20 has a columnar periphery 22. The drum 20 further has a plurality of mounts 23. These mounts 23 are arranged circularly along the periphery 22 and the adjacent mounts 23 are separated from each other. A driving member 10 connected to the drum 20 serves to drive the drum 20 to rotate in both clockwise and counterclockwise directions.

In the present embodiment, the rotating shaft 21 of the drum 20 has two ends thereof each provided with a fixing seat 24 such that the rotating shaft 21 can rotate with respect to the two fixing seats 24 at its two ends. The drum 20 is assembled to the top of the machining center 200 through the fixing seats 24. In the present embodiment, the drum 20 has two round tool discs, namely a first tool disc 25 and a second tool disc 26. The first tool disc 25 and the second tool disc 26 have equal outer diameters and are fixedly connected to the rotating shaft 21. The first tool disc 25 and the second tool disc 26 are mounted around the rotating shaft 21 and near the fixing seats 24 at the two ends of the rotating shaft 21, respectively. In the present embodiment, the periphery 22 is defined by circumferences of the first and second tool discs 25, 26 connected along the axial direction X of the rotating shaft 21. However, the present invention is not limited thereto. The periphery 22 may alternatively be defined as the periphery of an imaginary cylinder formed by the length occupied by the first and second tool discs 25, 26, or defined by the circumferences of three or more similar tool discs.

Figure 3:
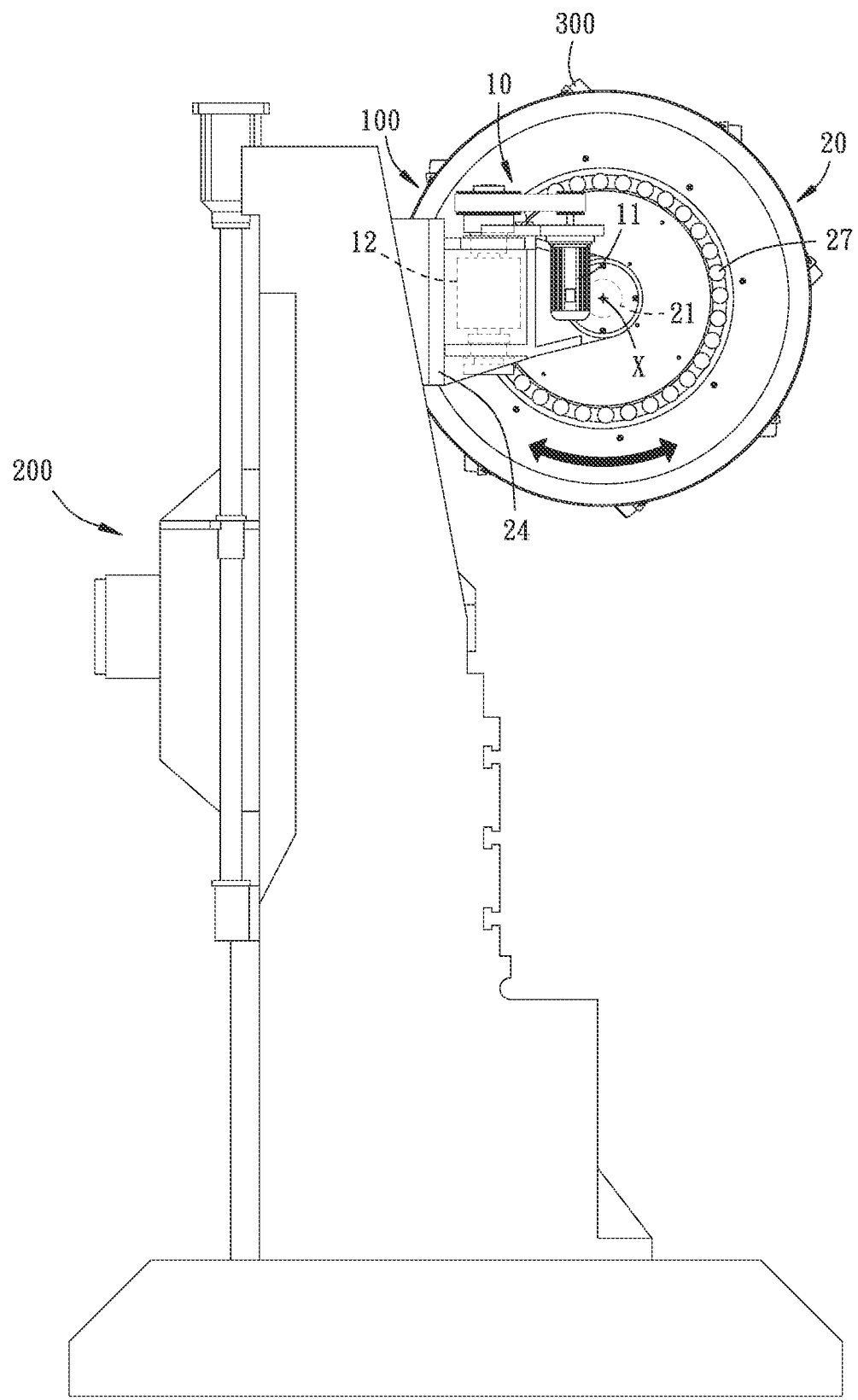
FIG. 3 is a schematic drawing of the tool magazine installed on the machining center according to the embodiment of the present invention, wherein the driving member can drive the drum to rotate in both clockwise and counterclockwise directions.
Figure 4:
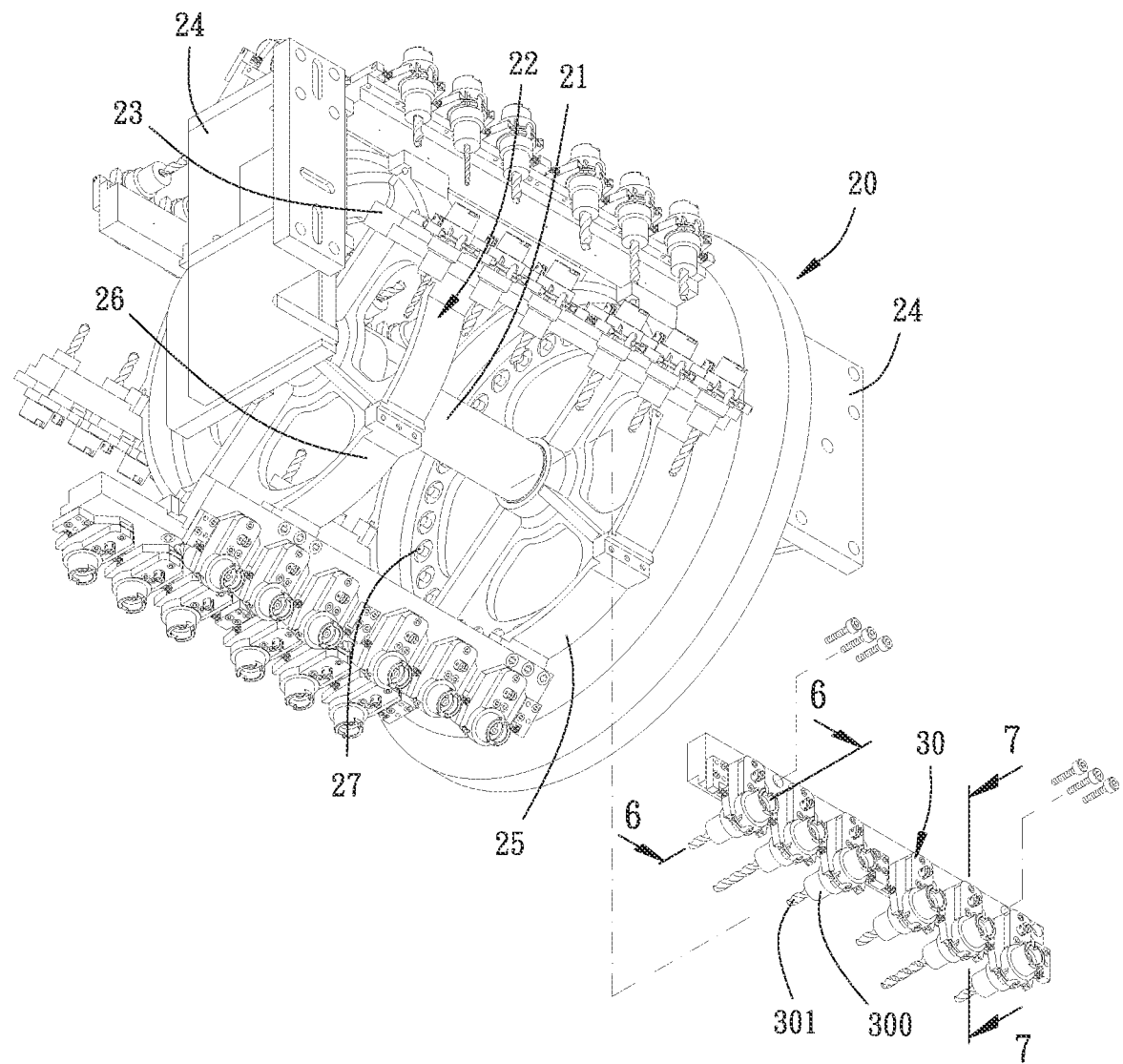
FIG. 4 is a schematic drawing of the embodiment of the present invention illustrating that tool clamps are mounted on the tool magazine together with the mounts.

In the present embodiment, the driving member 10 primarily comprises a motor 11 connected to a guiding member 12, as shown in FIG. 3. The first tool disc 25 has a plurality of equidistantly separated bearings 27 that are arranged circularly about the rotating shaft 21 (as shown in FIG. 3 and FIG. 4). The bearings 27 rotate with the first tool disc 25 and abut against the guiding member 12, respectively. Thereby, the motor 11 drives the guiding member 12 to rotate and in turn guide the bearings 27 abutting against to alternately move, so as to make the first tool disc 25 interlockingly drive the rotating shaft 21 and the second tool disc 26 to rotate simultaneously. Preferably, the bearing 27 is a handle bearing, and the guiding member 12 may correspondingly be a cam or a worm that abuts against and thereby guide the bearing 27. Additionally, the motor 11 and the guiding member 12 in the present embodiment may be installed in one of the fixing seats 24.

Figure 9:
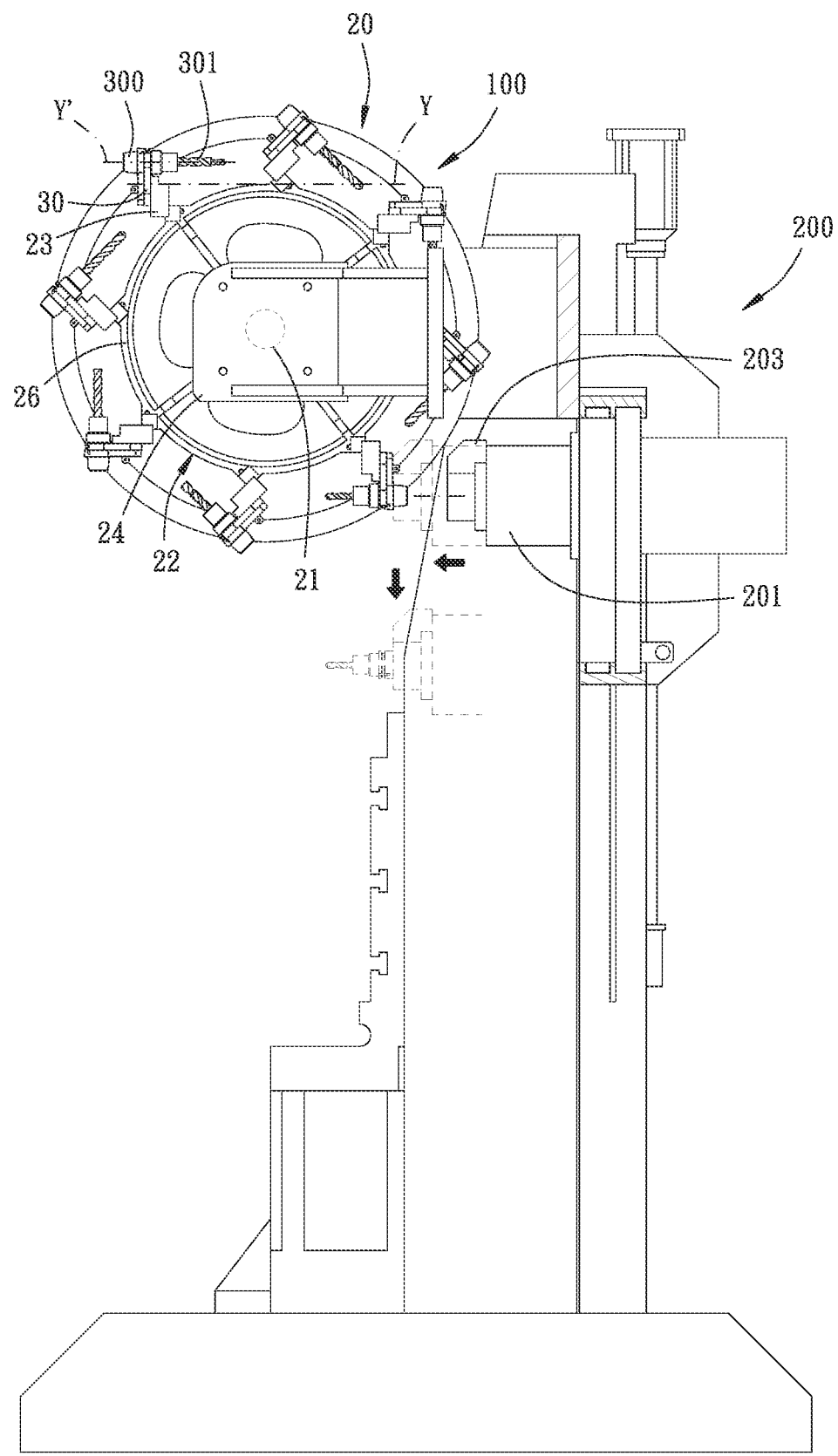
FIG. 9 is a schematic drawing of the embodiment of the present invention illustrating that the spindles of the machining center then move transversely for tool-taking and move downward vertically.

The tool clamps 30 are arranged abreast on each said mount 23 along the axial direction X of the rotating shaft 21 for clamping tool holders 300. The tool clamps 30 on the same mount 23 have tool-clamping jaws 31 thereof define the same tool-clamping direction. Every tool-clamping jaw 31 is parallel to a tangential direction Y of the periphery 22 and communicated with the corresponding tool clamp 30, so that the machining tools 301 held by the tool holders 300 clamped by all the tool clamps 30 are laid horizontal and gathered close to the periphery 22 of the drum 20. Specifically, the tool-clamping jaw 31 is communicated with the tool clamp 30 holding it in a communicating direction Y'. The communicating direction Y' is parallel to the tangential direction Y, as shown in FIG. 9. When a tool holder 300 holding a machining tool 301 is at the tool-clamping jaw 31 and clamped by the tool clamp 30, the axial direction of the tool holder 300 axial directions with the communicating direction Y' and therefore is also parallel to the tangential direction Y instead of being parallel to the axial direction X like the prior-art tool magazines. This is the very feature differentiate the tool magazine 100 of the present invention from the conventional devices.

In the present embodiment, there are eight mounts 23 arranged along the periphery 22 of the drum 20, as shown in FIG. 9. Each of the mounts 23 has a bar-like shape and spans between while being fixed to first tool disc 25 and the second tool disc 26. Each of the mounts 23 in the present embodiment has six tool clamps 30 arranged abreast. Thus, in the present embodiment, the tool magazine 100 has 48 tool clamps 30 in total, so 48 tool holders 300 can be stored in the tool magazine 100.

Figure 5:
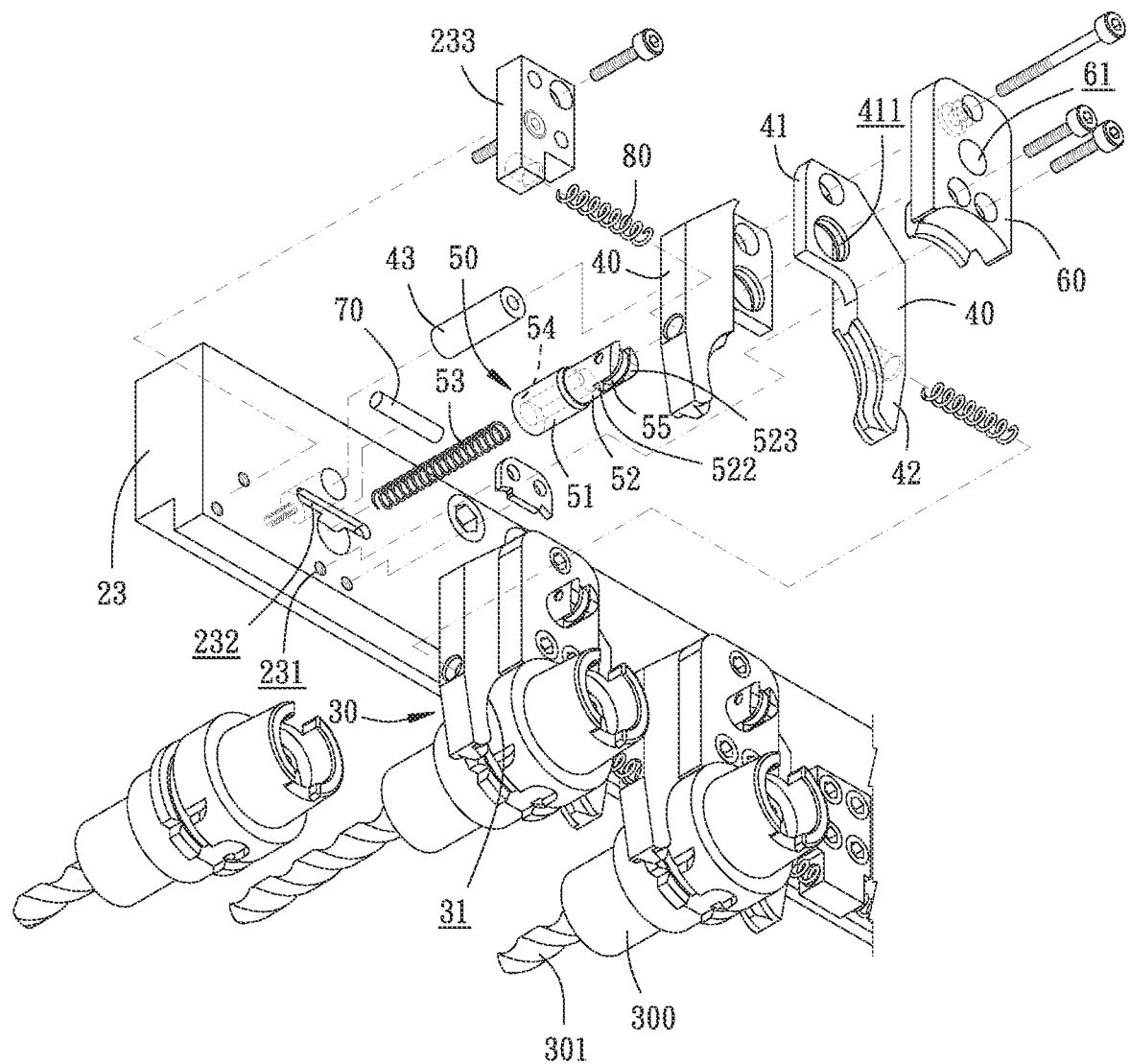
FIG. 5 is an exploded view of the tool clamps mounted on the mount according to the embodiment of the present invention.
Figure 6:
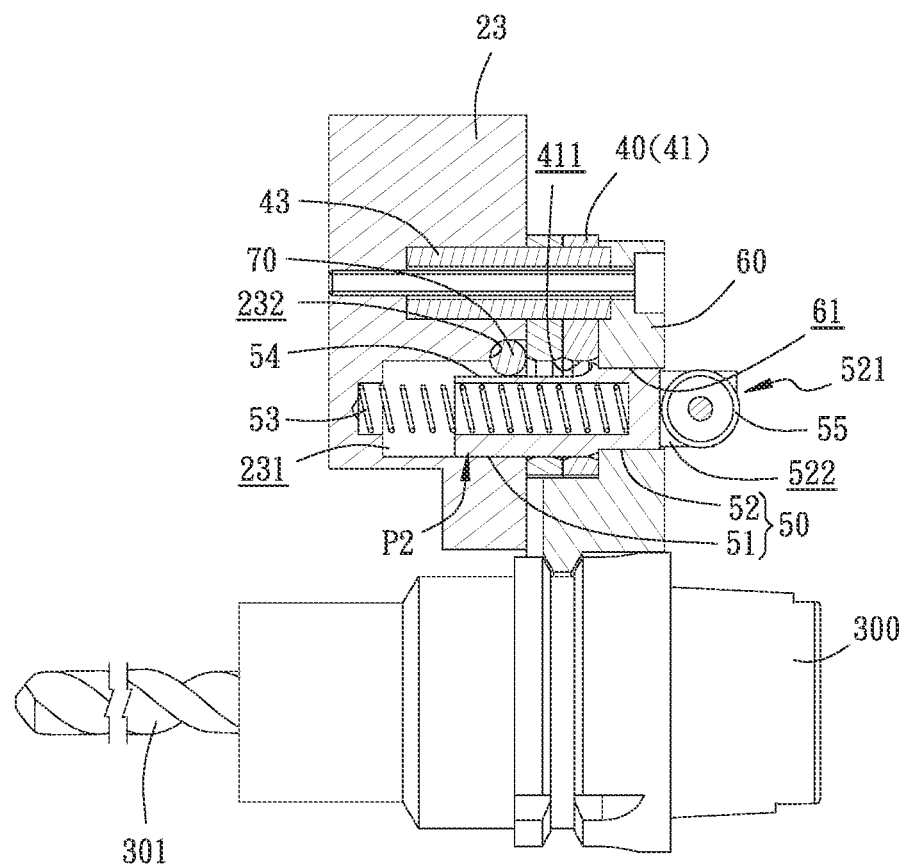
FIG. 6 is a cross-sectional view taken along Line 6-6 of FIG. 4.
Figure 7:
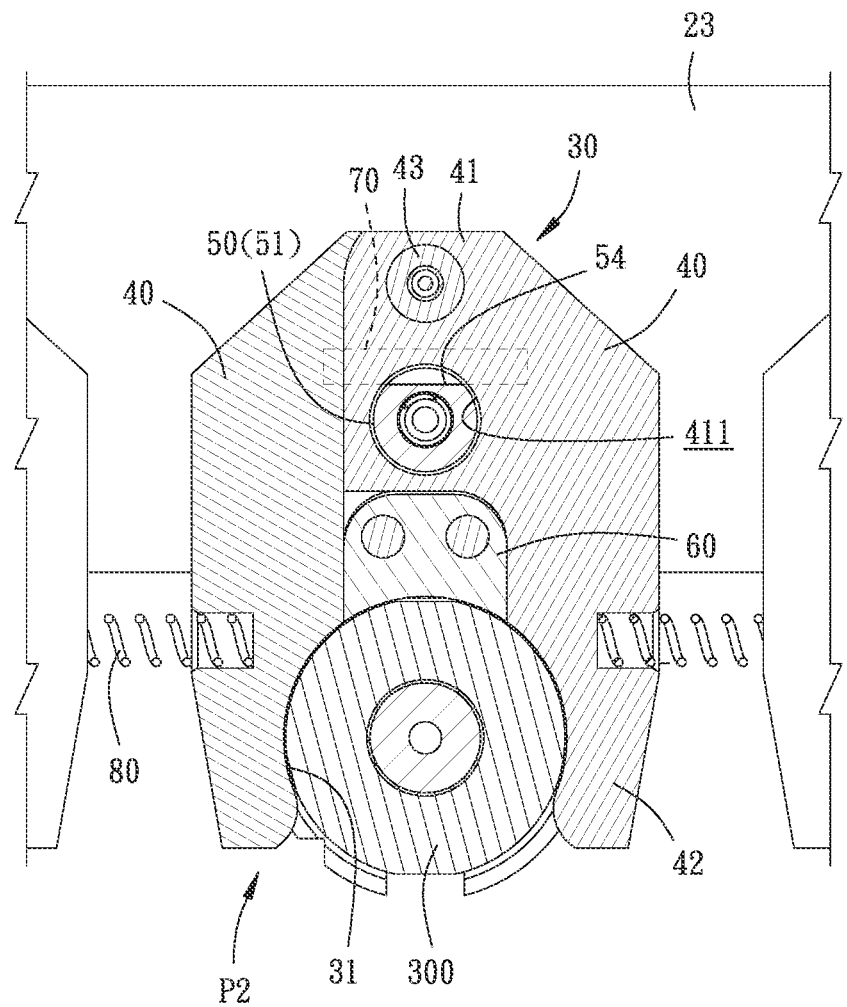
FIG. 7 is a cross-sectional view taken along Line 7-7 of FIG. 4.

As shown in FIG. 5 through FIG. 7, each of the tool clamps 30 includes two jaw members 40 and a pin 50. The two jaw members 40 are of the same structure and each have a connecting portion 41 and a jaw tip 42. The two connecting portions 41 are overlapped with each other and passed through by a shaft 43 so that they are pivotably connected to the mount 23. The two jaw tips 42 are drawn together or pulled apart from each other as the two connecting portions 41 pivot with respect to each other. The connecting portion 41 is a side plate thinner than the trunk of the jaw member 40. In the present embodiment, the two jaw members 40 are arranged in opposite directions so that when the two jaw members 40 are assembled, the two connecting portions 41 are overlapped with each other, thereby making the two jaw tips 42 located symmetrically. In addition, the two connecting portions 41 each have a pin hole 411. The two pin holes 411 are of the same diameter. The two pin holes 411 are aligned with each other when the two connecting portions 41 are overlapped.

Figure 12:
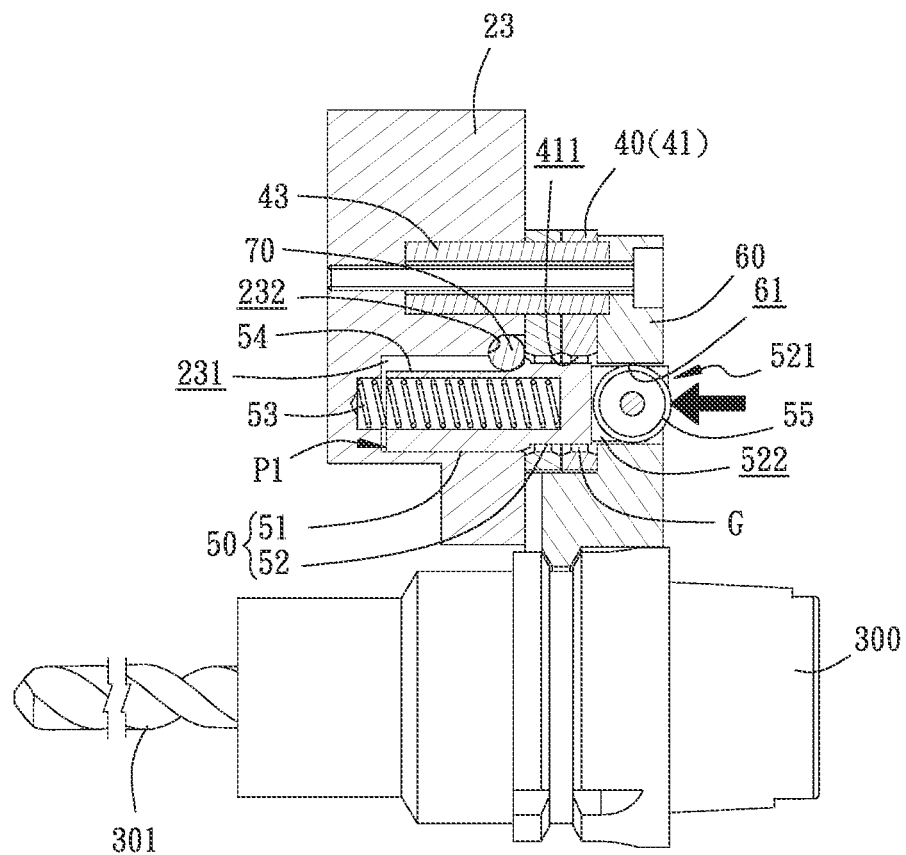
FIG. 12 is a schematic drawing of the embodiment of the present invention depicting that when the spindle engages with the tool holder, the pin is pressed by the pressing members and come to the unlocking position.
Figure 13:
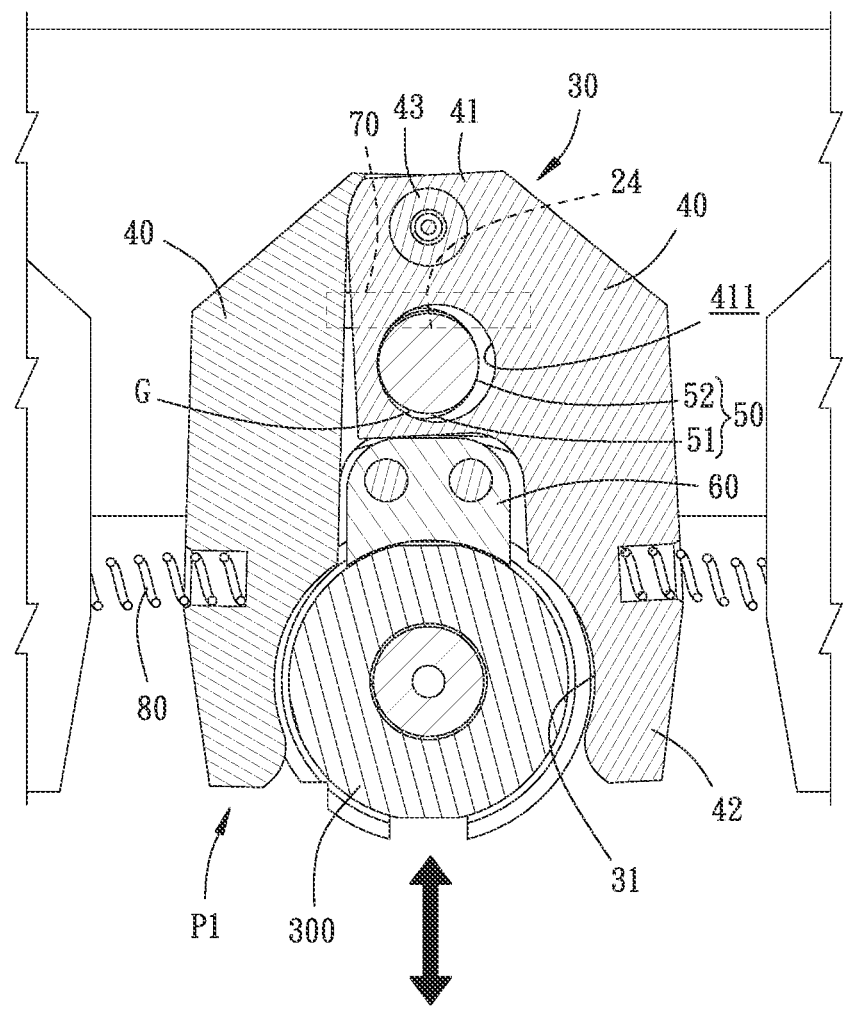
FIG. 13 is another schematic drawing according to FIG. 12 taken from a different perspective.
Figure 14:
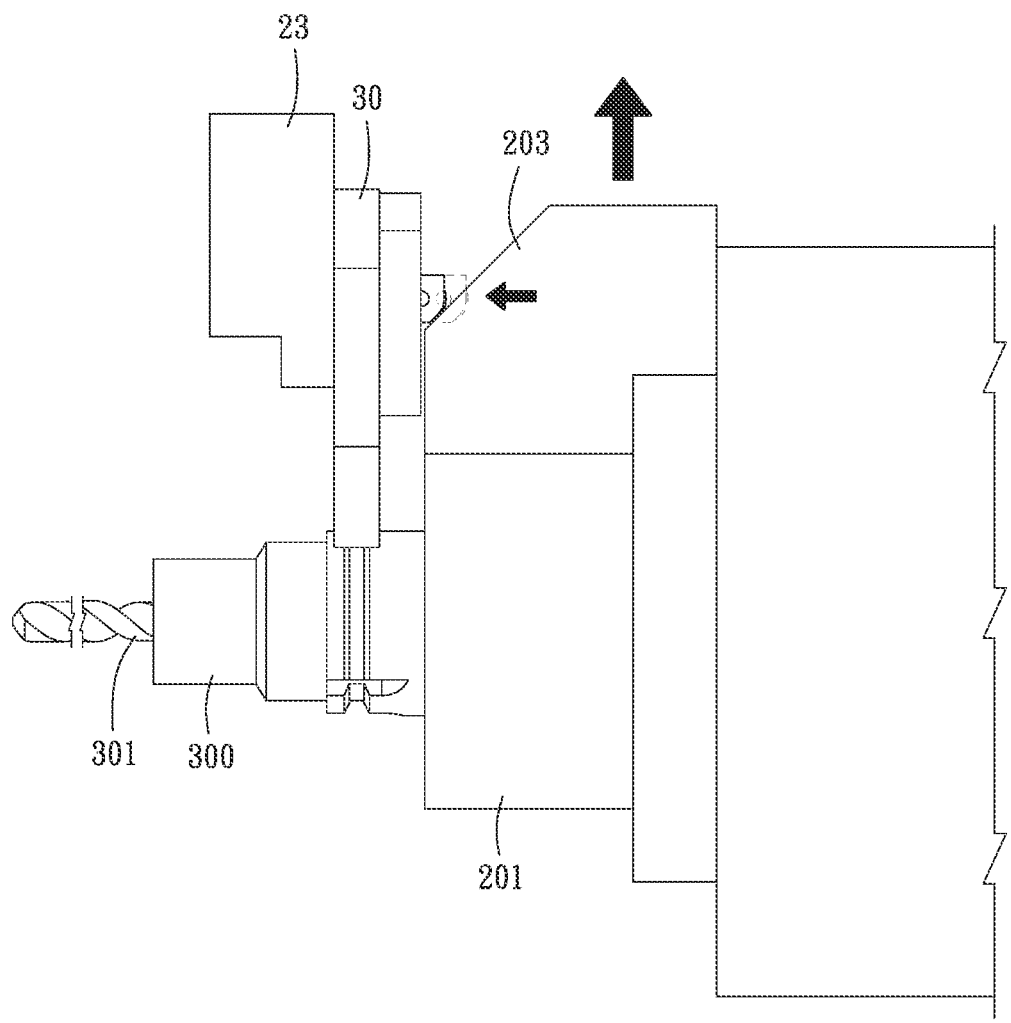
FIG. 14 is a schematic drawing of the embodiment of the present invention depicting that the spindle of the machining center takes the tool holder to replace the tool to the tool clamp, wherein the pressing member moves along the chamfer cut and pushes the pin to the unlocking position.

The pin 50 when installed on the mount 23 is parallel to the shaft 43 and is located on the mount 23 differently from the shaft 43. The pin 50 passes through the two aligned pin holes 411 in such a way that the pin 50 is allowed to move axially with respect to the mount 23 between an unlocking position P1 (as shown in FIG. 12 and FIG. 13) and a locking position P2 (as shown in FIG. 6 and FIG. 7).

When the pin 50 is in the unlocking position P1, the two jaw members 40 are allowed to pivot with respect to each other. When the tool holder 300 is for example connected to and moves with a spindle 201 or 202, the tool holders 300 exert a force between the two jaw tips 42 and push apart the two jaw tips 42, so that the tool holders 300 can be withdrawn from the tool clamps 30, or be replaced into the tool clamps 30. When the pin 50 is in the locking position P2, the two jaw members 40 are restricted by the pin 50 from pivoting with respect to each other. At this time, the tool holders 300 are clamped by the jaw tips 42 in position. Herein, the two jaw members 40 may pivot with respect to each other, in which case both of the two jaw members 40 are pivotable. Alternatively, one of the jaw members 40 is made immovable while the other is movable with respect to the immovable one jaw member 40. In either case, the two jaw members 40 can pivot with respect to each other as conceived by the present invention.

The pin 50 has a large-diameter section 51 and a small-diameter section 52. The large-diameter section 51 has a diameter approximately equal to the diameter of the two pin holes 411. The small-diameter section 52 has a diameter smaller than the diameter of the two pin holes 411. When the pin 50 is in the locking position P2, the large-diameter section 51 is closely fit in the two pin holes 411 to restrict the two jaw members 40 from pivoting with respect to each other. When the pin 50 is in the unlocking position P1, the small-diameter section 52 is loosely received in the pin holes 411 and separated from at least a part of the wall of each of the pin holes 411 by a gap G (as shown in FIG. 12 and FIG. 13). The gap G provides the room for the two jaw members 40 to pivot with respect to each other.

Preferably, in the present embodiment, there is further a positioning base 60 fastened to the mount 23. The positioning base 60 is stacked on the two connecting portions 41. Between the positioning base 60 and the mount 23, there is a room for the two jaw members 40 to pivot. Therein, the positioning base 60 has a through hole 61. When the positioning base 60 is fastened to the mount 23, this through hole 61 is aligned with the two pin holes 411. The through hole 61 and the small-diameter section 52 have the same diameter. When the pin 50 is in the locking position P2, the large-diameter section 51 is closely fit in the two pin holes 411, while the small-diameter section 52 is closely fit in the through hole 61. The small-diameter section 52 now leaves an exposed section 521 outside the through hole 61. When the exposed section 521 is pushed into the through hole 61, the pin 50 moves from the locking position P2 to the unlocking position P1.

In the present embodiment, the mount 23 has a pin slot 231 for accommodating the pin 50. The pin slot 231 receives therein a return spring member 53. The return spring member 53 in the present embodiment may be a compression spring. The pin 50 in the pin slot 231 has its large-diameter section 51 abutted by the return spring member 53, so that the pin 50 is normally pushed by the return spring member 53 toward the locking position P2. When the pin 50 moves to the unlocking position P1, the return spring member 53 is compressed and generates a pre-force. After the force compressing the return spring member 53 disappears, the pre-force makes the pin 50 return to the locking position P2.

In the present embodiment, the pin 50 has a side near the large-diameter section 51 formed with a tangent plane 54. This tangent plane 54 is formed as the side of the large-diameter section 51 of the pin 50 is radially recessed to form a plane that axially extends. A retainer 70 is installed on the mount 23 to be next to the pin slot 231 and press on the tangent plane 54. The retainer 70 as used in the present embodiment has a column body. The mount 23 has a recess 232 to receive and position the retainer 70. When the pin 50 moves axially with respect to the mount 23, the retainer 70 restricts the pin 50 from deflecting.

Accordingly, when the pin 50 is in the unlocking position P1, the small-diameter section 52 and the wall of the pin hole 411 of the upper jaw member 40 are separated by the gap G, so the upper jaw member 40 has a pivoting range greater than that of the lower jaw member 40, but the present invention is not limited thereto. In other words, the small-diameter section 52 may be separated from at least a part of the wall of each of the pin holes 411 of the both jaw members 10 by the gap G (not shown), so that the two jaw members 40 have the same pivoting range.

In the present embodiment, the pin 50 has a notch 522. The notch 522 is located in the exposed section 521. A roller 55 is rotatably installed on the exposed section 521 and received in the notch 522. Moreover, the pin 50 has a chamfer cut 523 located atop the exposed section 521. The chamfer cut 523 has a side facing the notch 522 formed with a curved profile. The roller 55 is exposed atop a side of the pin 50 near the chamfer cut 523. Thereby, when the roller 55 is pushed, the exposed section 521 is in turn pushed into the through hole 61.

Referring to FIG. 5, in the present embodiment, each of the jaw members 40 has its outer side abutted by a further return spring member 80. The further return spring member 80 in the present embodiment may be a compression spring. When the two jaw members 40 pivot with respect to each other, the jaw member 40 pivoting outward compress the respective further return spring member 80. Later when the further return spring member 80 is released, the further return spring member 80 drives the jaw member 40 to pivot back. Herein, some of the further return spring members 80 are provided between two adjacent tool clamps 30. These further return spring members 80 each have their two ends abutting between the opposite jaw members 40 of the adjacent tool clamps 30. Some of the further return spring members 80 may have a single end abutting against the jaw member 40 of the respective tool clamp 30, and have the other end abutting against a stopper 233 provided on the mount 23. In the present embodiment, there are three stoppers 233 provided on the mount 23. Two of them are located at the outer sides of the two lateralmost tool clamps 30 on the mount 23. The remaining one stopper 233 is located at the middle of the mount 23. In the present embodiment, in virtue of the stoppers 233, the further return spring members 80 can make the pivoting away jaw members 40 of the tool clamps 30 pivot back.

Figure 8:
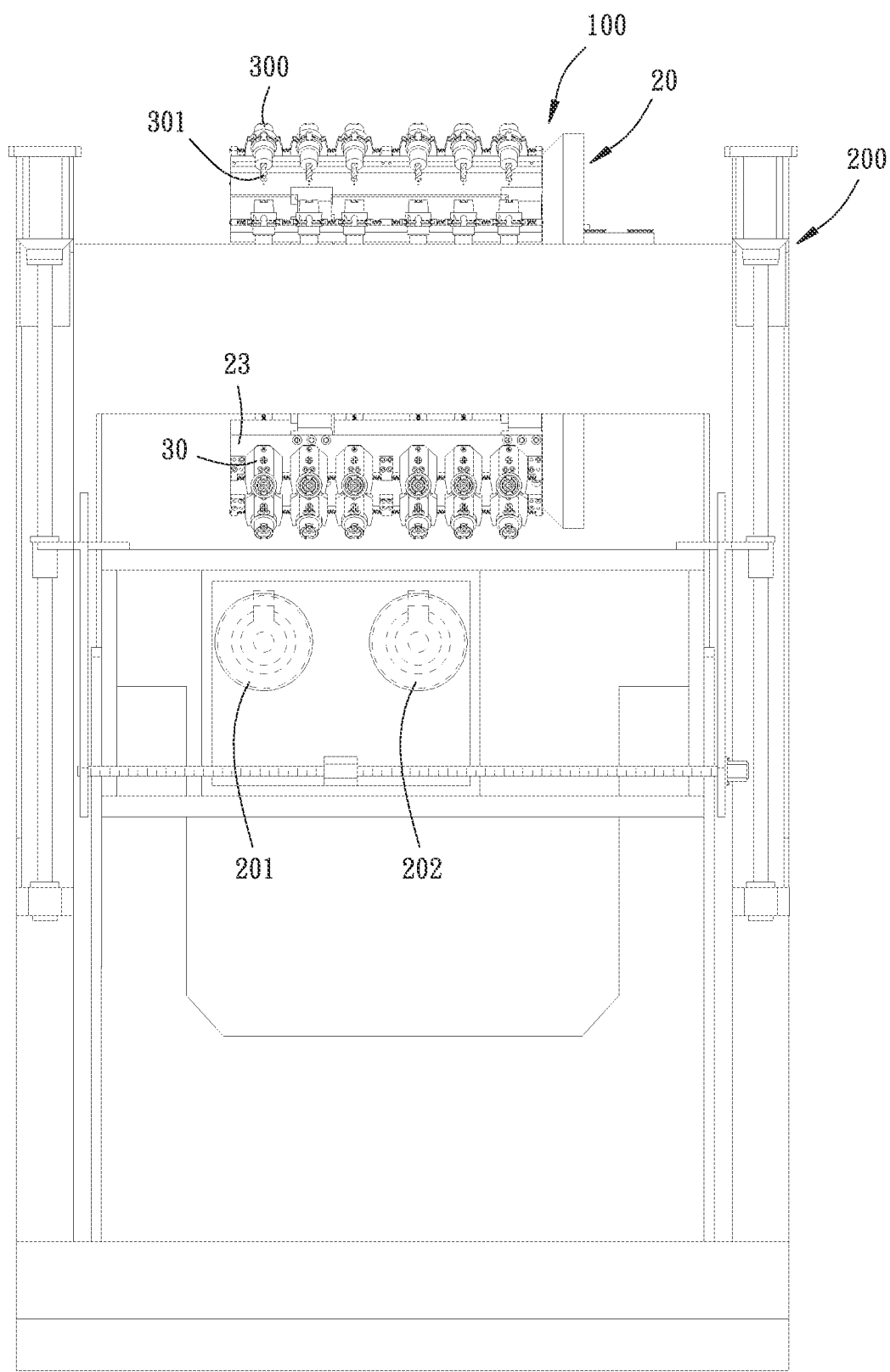
FIG. 8 is a schematic drawing of the embodiment of the present invention illustrating that the two spindles of the machining center move transversely to predetermined positions, and the drums have been rotated by the driving member to locations for picking up of tool holders.
Figure 10:
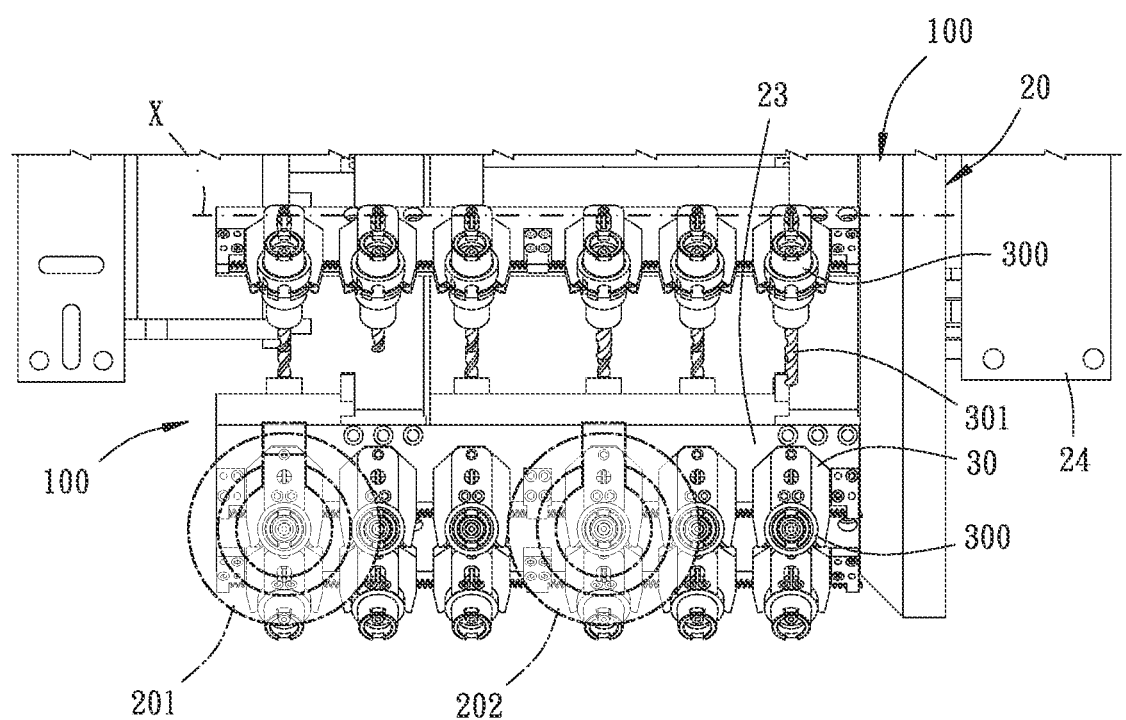
FIG. 10 is a schematic drawing of the embodiment of the present invention depicting that the two spindles are aligned with tool holders at two tool clamps on the same mount.
Figure 11:
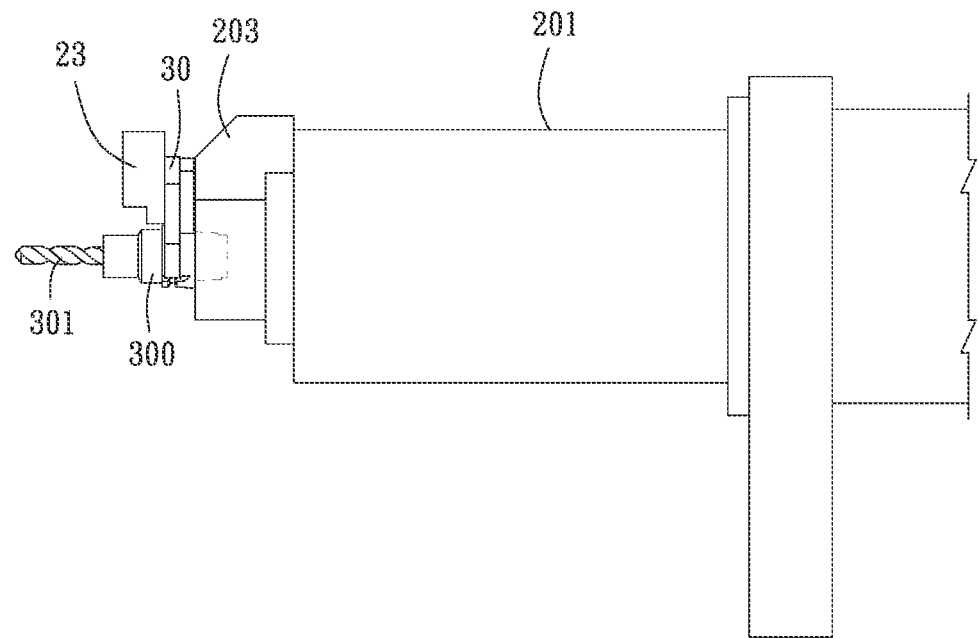
FIG. 11 is a schematic drawing of the embodiment of the present invention depicting that the spindle stretches out to the tool clamp to engage with the tool holder.

In the present embodiment, the tool magazine 100 is used with a machining center 200, which may be a double-column machining center. This machining center 200 may have two spindles 201, 202. The two spindles 201, 202 are movable on the machining center 200 vertically and transversely, and can directly take and replace a tool holder 300 holding a machining tool 301 without using any tool-changing arm. When the two spindles 201, 202 are not loaded and about to pick up desired machining tools 301 held by targeted tool holders 300 at the corresponding tool clamps 30, the drum 20 of the tool magazine 100 can rotate, as shown in FIG. 3 to move the targeted tool holders 300 toward the machining center 200. Meanwhile, the machining center 200 align the two spindles 201, 202 with the targeted tool holders 300, and then move them toward the tool holders 300, as shown in FIG. 8 through FIG. 10. Afterward, the two spindles 201, 202 each use their respective pressing member 203 to contact the exposed section 521 and press on the roller 55 so that the exposed section 521 is pushed into the through hole 61 and in turn moves the pin 50 to the unlocking position P1. At this time, the gap G between the small-diameter section 52 and the wall of the pin hole 411 allows the jaw members 40 to pivot, as shown in FIG. 1 and FIG. 13, to pull the two jaw tips 42 apart, thereby the corresponding tool holder 300 can be pulled out by the spindle 201 or 202 and withdrawn from the tool clamp 30.

Figure 15:
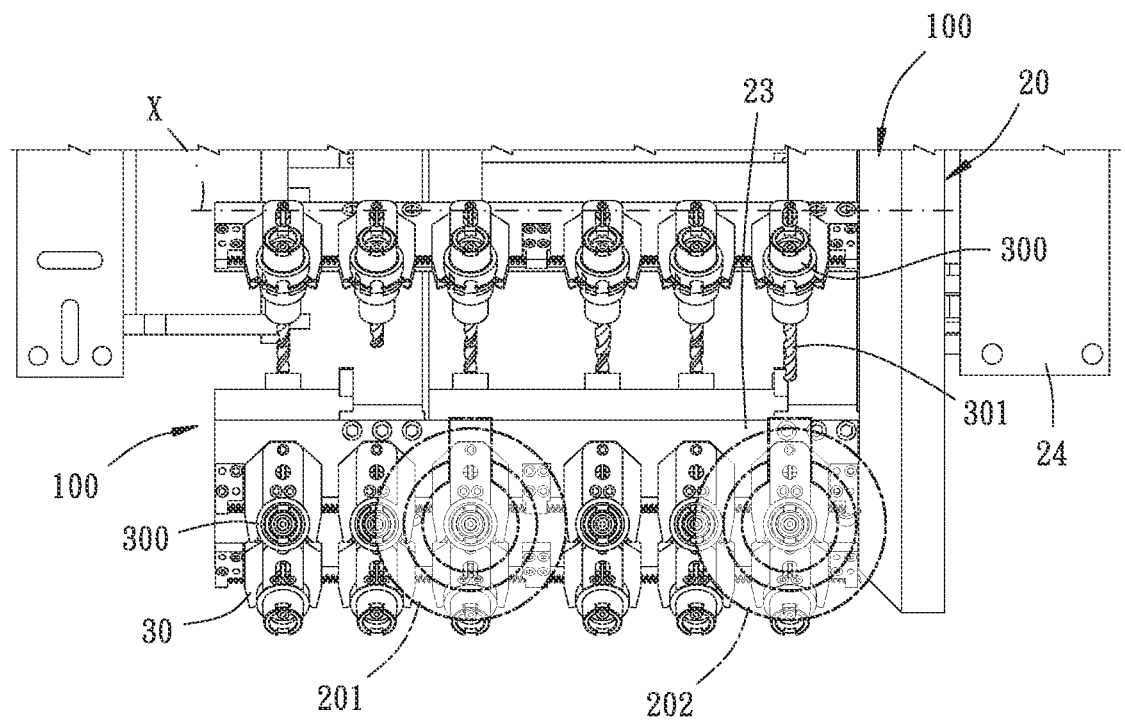
FIG. 15 is a schematic drawing of the embodiment of the present invention depicting that the spindles are aligned with tool holders in two other tool clamps on the same mount.

After the machining center 200 uses the machining tools 301 now on the two spindles 201, 202 to finish the current processing job and need alternative machining tools 301 for a different processing job, the machining center 200 drives the spindles 201, 202 to return the used tool holders 300 to the tool clamps 30 for storage. To this end, the pressing member 203 moves along the chamfer cut 523 to come into contact with the exposed section 521 and presses on the roller 55, as shown in FIG. 14, to once again push the exposed section 521 into the through hole 61 and move the pin 50 to the unlocking position P1. As a result, the two jaw tips 42 are open to alto the tool holder 300 to leave with the corresponding spindle 201 or 202, which later sends the tool holder 300 and the machining tool 301 back to the tool clamp 30. In the event that the newly desired machining tools 301 are located in the same mount 23, the drum 20 can stay idle and wait for the machining center 200 to move the two spindles 201, 202 to replace the used machining tools 301 and then transversely move the two spindles 201, 202 to the locations of the newly desired machining tools 301, as shown in FIG. 15. Then the tool-taking operation as described previously can be repeated to pick the newly desired machining tools 301 for the tool clamps 30. If the newly desired machining tools 301 are in different mount 23 from the mount 23 for storing the used machining tool 301, the machining center 200 rotates the drum 20 to help the two spindles 201, 202 align with the tool holders 300 holding the newly desired machining tools 301. Then the tool-taking operation as described previously can be repeated to pick the newly desired machining tools 301 for the tool clamps 30.

After the tool holder 300 is replaced or withdrawn, the pin 50 is in the locking position P2 because it is normally pushed by the return spring member 53. Thus, the large-diameter section 51 is closely fit in the two pin holes 411 since their diameters are approximately equal. This prevents the two jaw members 40 from pivoting with respect to each other. As a result, a tool holder 300 now in the tool clamp 30 can be held securely by the two jaw tips 42. Unless the pin 50 moves to the unlocking position P1 again, the tool holder 300 can never be taken out from the two jaw tips 42, thereby securing the tool holder 300 in the tool clamp 30.

As can be learned from the description above, the present invention has the following features:

1. The disclosed tool magazine 100 is a drum 20 with mounts 23 arranged circularly along its columnar periphery 22, and each of the mounts 23 has plural tool clamps 30 arranged abreast, so everywhere on the entire periphery 22 of the drum 20 is used to carry as many as tool clamps 30. Additionally, since the tool-clamping jaws 31 of the tool clamps 30 are parallel to the tangential direction Y of the drum periphery 22 and communicated with the tool clamps 30, all the machining tools 301 held by the tool holders 300 can come very close to the drum 20. With this design, the capacity of the drum 20 for carrying tool clamps 30 can be effectively increased by slightly increasing the length or diameter of the drum 20, thereby making the most use of space to providing more tool holders 300 without significantly increasing the volume of the tool magazine 100.

2. Moreover, because the tool clamps 30 on the same mount 23 are arranged abreast and their tool-clamping jaws 31 have the same tool-clamping direction, the disclosed tool magazine 100 when working with a multi-axis machining center (i.e., one having two or more spindles) can allowing two or more spindles 201 to directly perform tool-taking or tool-returning operation on tool holders 300 clamped by the tool clamps 30 arranged abreast on the same mount 23 at the same time without using any tool-changing arm. As compared to the prior-art device that support a single spindle or use an additional tool-changing arm for tool-changing operation, the present invention can significantly save tool-changing time during operation of the machining center, thereby effectively improving processing efficiency.

The tool clamp 30 of the present invention further features a secure tool-locking mechanism. This means that only when the pin 50 is in the unlocking position P1, can the tool holder 300 push apart the two jaw tips 42 and withdrawn from the tool clamp 30 or replaced into the tool clamp 30. When the pin 50 is in the locking position P2, the two jaw members 40 are restricted from pivoting with respect to each other. At this time, the two jaw members 40 restricted by the pin 50 jointly prevent the two jaw tips 42 from being pushed apart. This means that even if the tool holder 300 receives an unexpected force, the tool holder is secured in the tool clamp 100, thereby realizing the desired secure tool-locking mechanism that effectively prevents the tool holder 300 from coming off the tool clamp 30 unintentionally.

The present invention has been described with reference to the preferred embodiments and it is understood that the embodiments are not intended to limit the scope of the present invention. Moreover, as the contents disclosed herein should be readily understood and can be implemented by a person skilled in the art, all equivalent changes or modifications which do not depart from the concept of the present invention should be encompassed by the appended claims.

What is claimed is:

1. A drum-type tool magazine adaptive to a multi-axis machining center such that the drum-type tool magazine is configured for allowing the machining center to use at least one spindle to directly take and replace tool holders holding machining tools from and to, respectively, the drum-type tool magazine, the drum-type tool magazine comprising:

a driving member;

a drum, being centrally provided with a rotating shaft and having a columnar periphery along which periphery a plurality of separated mounts are arranged circularly, wherein the driving member is connected to and thereby drives the drum to rotate about a rotation axis, and the rotating shaft has two ends thereof, wherein each of the two ends is provided with a respective fixing seat for engaging with the machining center, and wherein the drum has two round tool discs that have equal outer diameters and are fixedly connected to the rotating shaft, so that the periphery is defined by circumferences of the two tool discs connected along an axial direction of the rotation axis, and the two tool discs are located on the rotating shaft about the rotation axis, wherein the tool mounts are each fixed to the outside of the two tool discs for rotation with the two tool discs about the rotation axis; and a plurality of tool clamps for clamping the tool holders, the tool clamps being arranged abreast along the axial direction of the rotation axis and being mounted on the mounts such that plural ones of the tool clamps are mounted on each of the mounts, wherein the tool clamps each have a respective two tool-clamping jaws, wherein each pair of the tool-clamping jaws opens and closes in a direction along the rotation axis, wherein a respective longitudinal axis of each of the tool-clamping jaws is parallel to a tangential direction that is tangential to the periphery, and each pair of the tool-clamping jaws is configured to hold a respective tool holder such that the machining tool held by the corresponding tool holder is configured with a respective longitudinal axis of the corresponding machining tool being non-radial and non-axial relative to the rotation axis and with the respective longitudinal axis of the corresponding machining tool being parallel to a tangential direction that is tangential to the periphery.

2. The drum-type tool magazine of claim 1, wherein the two tool discs include a first tool disc and a second tool disc, wherein the first tool disc has a plurality of equidistantly separated bearings that encircle the rotating shaft, and the driving member includes a motor connected to a guiding member, wherein the bearings rotate with the first tool disc and abut against the guiding member, respectively, whereby the motor drives the guiding member to rotate and in turn guide the bearings abutting against the guiding member to move, so as to make the first tool disc interlockingly drive in rotation the rotating shaft and the second tool disc.

3. The drum-type tool magazine of claim 1, wherein each of the mounts has a bar-like shape and spans between, while being fixed to, the two tool discs, and each of the tool clamps includes a respective two jaw members, wherein each of the jaw members has a respective connecting portion and a respective jaw tip, wherein the two connecting portions of each of the tool clamps are overlapped with each other and pivotably connected to the corresponding mount by a corresponding common shaft that passes through the two jaw members, and the jaw tips of each of the tool clamps are drawn together or pulled apart when the corresponding two connecting portions pivot with respect to each other.

4. The drum-type tool magazine of claim 3,
wherein each of the tool clamps includes a respective pin, wherein for each of the tool clamps, when the pin thereof is installed on a given one of the mounts, a corresponding longitudinal axis of the corresponding pin is parallel to a corresponding longitudinal axis of the corresponding shaft and the pin passes through the corresponding two connecting portions at a location different from where the corresponding shaft passes through the corresponding two connecting portions, and wherein each of the pins is axially movable in the direction of the longitudinal axis of the corresponding pin, with respect to the corresponding mount between a respective unlocking position and a respective locking position, so that when the corresponding pin is in the corresponding unlocking position, the corresponding two jaw members are allowed to pivot with respect to each other, thereby allowing the corresponding tool holder to be withdrawn or replaced by pushing the corresponding two jaw tips apart; and when the corresponding pin is in the corresponding locking position, the corresponding two jaw members are restricted from pivoting with respect to each other, so the corresponding tool holder is clamped securely between the corresponding two jaw tips.

5. The drum-type tool magazine of claim 4, wherein for each of the tool clamps, the two connecting portions each have a respective pin hole, wherein for each of the tool clamps, the two pin holes are of an identical diameter and are aligned with each other when the corresponding two connecting portions are overlapped so that the corresponding pin can pass through the corresponding two pin holes, and each of the pins has a respective larger-diameter section that has a diameter approximately equal to the diameter of the corresponding two pin holes and a smaller-diameter section that has a diameter smaller than the diameter of the corresponding two pin holes, whereby when the corresponding pin is in the corresponding locking position, the corresponding larger-diameter section is fit in the corresponding two pin holes so as to restrict the corresponding two jaw members from pivoting with respect to each other; and when the corresponding pin is in the corresponding unlocking position, the smaller-diameter section is received in the corresponding pin holes and separated from the walls of the corresponding pin holes by a gap that allows the corresponding two jaw members to pivot with respect to each other.

6. The drum-type tool magazine of claim 5, wherein the mounts each have a plurality of pin slots, each of the pin slots configured for such accommodating a respective one of the pins such that the corresponding pin abuts against a respective return spring member in the corresponding pin slot and the corresponding pin is normally pushed toward the corresponding locking position by the corresponding return spring member, so that when the corresponding pin moves to the corresponding unlocking position, the corresponding return spring member is compressed to generate a respective pre-force, which respective pre-force later returns the corresponding pin to the corresponding locking position.

7. The drum-type tool magazine of claim 6, further comprising a plurality of positioning bases, wherein each of the positioning bases is fastened to a corresponding one of the mounts and is stacked on a corresponding two of the connecting portions, wherein each of the positioning bases is formed with a respective through hole that is aligned with the two pin holes of the corresponding two of the connecting portions and that has a diameter equal to the diameter of the corresponding smaller-diameter section, whereby when the corresponding pin is in the corresponding locking position, the corresponding larger-diameter section is fit in the corresponding two pin holes, and the corresponding smaller-diameter section is fit in the corresponding through hole and leaves a respective exposed section outside, and when the corresponding exposed section is pushed into the corresponding through hole, the corresponding pin moves from the corresponding locking position to the corresponding unlocking position.

8. The drum-type tool magazine of claim 7, wherein each of the pins has a respective notch located in the corresponding exposed section, and a respective roller is rotatably installed on a corresponding one of the exposed sections is and received in the corresponding notch, so that when the corresponding roller is pushed, the corresponding exposed section is in turn pushed into the corresponding through hole.

9. The drum-type tool magazine of claim 8, wherein each of the pins has a respective chamfer cut located atop the corresponding exposed section, and each of the chamfer cuts has a respective side that is facing the corresponding notch and is formed with a corresponding curved profile, so that the corresponding roller is exposed atop a corresponding side of the corresponding pin.

10. The drum-type tool magazine of claim 6, wherein each of the pins has a respective side at the corresponding larger-diameter section and radially recessed with respect to the longitudinal axis of the corresponding pin to form a respective tangent plane that extends in the axial direction with respect to the longitudinal axis of the corresponding pin, and for each of the pins, a respective retainer is installed on the corresponding mount to be next to the corresponding pin slot and press on the corresponding tangent plane, whereby each of the pins is restricted by the corresponding retainer from deflecting when the corresponding pin moves axially, in the direction of the corresponding pin longitudinal axis, with respect to the corresponding mount.

11. The drum-type tool magazine of claim 4, wherein each of the jaw members has a respective outer side abutted by a respective return spring member, so that when at least one of the jaw members pivots outward, the corresponding return spring member is compressed, and later when the corresponding return spring member is released, the corresponding return spring member drives the at least one of the jaw members to pivot back.

12. The drum-type tool magazine of claim 11, wherein any said return spring member that is located between two adjacent ones of said tool clamps has a corresponding two ends thereof abutting against the opposite said jaw members of the two adjacent tool clamps, respectively, and any said return spring member that is not located between two adjacent ones of said tool clamps has only one end abutting against one of the jaw members of a said tool clamp and has its opposite return spring member end abutting against a corresponding stopper installed on the corresponding mount.

* * * * *